United States Patent
Kawamoto et al.

(10) Patent No.: US 8,395,888 B2
(45) Date of Patent: *Mar. 12, 2013

(54) INFORMATION-PROCESSING APPARATUS

(75) Inventors: Tetsuya Kawamoto, Osaka (JP); Akira Iwamoto, Osaka (JP); Masaru Furujiku, Osaka (JP); Hitoshi Nakatani, Osaka (JP); Shintaro Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 239 days.

This patent is subject to a terminal disclaimer.

(21) Appl. No.: 12/888,470

(22) Filed: Sep. 23, 2010

(65) Prior Publication Data

US 2011/0075343 A1   Mar. 31, 2011

(30) Foreign Application Priority Data

Sep. 28, 2009  (JP) ................................. 2009-222207

(51) Int. Cl.
*G06F 1/16* (2006.01)

(52) U.S. Cl. ................... 361/679.21; 174/548; 345/176; 349/258; 455/556.1

(58) Field of Classification Search .................. 174/548, 174/59, 520, 50.52, 50, 260; 345/156, 173, 345/174, 629, 473, 176, 36, 168, 184, 211, 345/212, 589, 520, 205, 77; 361/679.53, 361/679.54, 679.21, 679.22, 679.23, 679.24, 361/679.25, 679.26, 679.46, 679.47, 679.55, 361/679.33; 16/297, 321, 349; 206/308.1, 206/723; 349/33, 153, 39, 139, 141, 258; 349/61, 58; 438/194, 166, 688, 30, 478; 455/418, 550.1, 575.1, 575.3, 558, 556.1, 455/90.2, 556.2, 566, 411

See application file for complete search history.

(56) References Cited

U.S. PATENT DOCUMENTS

| 7,106,580 B2 | 9/2006 | Kugimiya et al. |
| 2010/0232096 A1* | 9/2010 | Chen .......................... 361/679.01 |
| 2011/0075356 A1* | 3/2011 | Tanaka et al. ............. 361/679.55 |
| 2011/0075378 A1* | 3/2011 | Tanaka et al. .................. 361/724 |

FOREIGN PATENT DOCUMENTS

JP    2005-165475    6/2005

* cited by examiner

*Primary Examiner* — Hung Duong

(74) *Attorney, Agent, or Firm* — Wenderoth, Lind & Ponack, LLP.

(57) ABSTRACT

A laptop computer includes: a substantially rectangular first chassis accommodating a display section; a substantially rectangular second chassis accommodating an operation control section; and a hinge mechanism coupling one side of the second chassis and one side of the first chassis. Another side parallel to the one side of the first chassis is configured so that only its widthwise central portion in parallel to the one side lays side-by-side to form a substantially flat face with another side of the second chassis when the chassis are closed together. The other side of the first chassis is configured, in a planar view, so that the more it departs from the central portion toward an edge portion in the widthwise direction, the more it comes closer to the one side of the first chassis than to the other side of the second chassis when the chassis are closed together.

3 Claims, 4 Drawing Sheets

INFORMATION-PROCESSING APPARATUS

BACKGROUND OF THE INVENTION

The present invention relates to an openable and closable folding information-processing apparatus, for example a laptop personal computer (hereinafter called "laptop PC" as an abbreviated expression, appropriately), and specifically to a structure of a chassis in such an information-processing apparatus.

As is well known, the chassis of the openable and closable folding information-processing apparatus such as a laptop PC and the like, is constituted by a display section side chassis (hereinafter called a "first chassis", appropriately) which accommodates the display section having a display screen such as a liquid crystal type and an operation control section side chassis (hereinafter called a "second chassis", appropriately) which accommodates the operation control section capable of generating a display signal which is to be inputted into the display section. Both chassis are coupled together by a hinge mechanism in a relatively openable and closable manner. In more detail, both the first chassis and the second chassis are usually formed to a substantially rectangle shape in a planar view, and each one side (a rear side from a user's view in a state where the user uses the electronic apparatus) of the first and the second chassis are coupled together via a hinge mechanism, such that both chassis can perform relatively opening and closing motion around a hinge axle. It is to be noted that the operation control section includes an input device such as a keyboard, signal processing circuits for generating display signals outputted to the display section based on input operations by the input device, a central processing unit (so-called CPU), and peripheral components thereof.

In the conventional information-processing apparatus, the first chassis and the second chassis are configured to have the same shape and the same size in the planar view. And, when both the chassis are closed together, each side of the first and the second chassis lays side-by-side to form a substantially flat face. Accordingly, With regard to another side (that is, the front side as viewed by the user in a state where the user operates the information-processing apparatus) parallel to, in a planar view, the one sides coupled together by a hinge mechanism of the first and second chassis, the front side surface of the first chassis and the front side surface of the second chassis lay side-by-side to form a substantially flat face.

When an impact load is applied from the front side (the other side) to the information-processing apparatus having such a construction, for example by a front-first dropping, the impact load is substantially equally inputted into the front side surface of the first chassis and the front side surface of the second chassis.

As is well known, the operation control section accommodated in the second chassis is provided with many rigid components having rigidity above a certain level, for example, the input device such as the keyboard, so-called CPU and the peripheral components thereof and the like, and accordingly the operation control section has a relatively high impact resistance. On the other hand, the display section accommodated in the first chassis has the display screen such as the liquid crystal type, which has a relatively low impact resistance, and accordingly the display section is less resistant to the impact than the operation control section of the second chassis side. Therefore, as stated above, in the case the front side surface of the first chassis and the front side surface of the second chassis lays side-by-side to form a substantially flat face, in a state where the information-processing apparatus is folded, the display section accommodated in the first chassis tends to be subjected to larger damage than the operation control section of the second chassis side. Further, the impact load inputted from the front side of the first chassis is transmitted to the hinge mechanism which couples the first chassis to the second chassis in an openable and closable manner, and may severely damage the hinge mechanism.

In relation to such technical problems, Japanese Patent Laid-open Publication No. 2005-165475, for example, discloses a constitution in which hollow bulge portions protruding outwardly in a state where the first chassis is closed together are respectively formed at four corners of the second chassis. The constitution is to attempt to reduce the impact load received by the first chassis (that is, by the display section side) since the bulge portions provided to the second chassis receive the impact load, when an impact load is inputted from the side of the laptop PC.

However, in the constitution disclosed in Japanese Patent Laid-open Publication No. 2005-165475, since the hollow bulge portions are formed at four corners of the second chassis, the shape of the second chassis is complicated and also the manufacturing cost thereof is increased, and further, the users feel inconvenience in carrying the laptop PC in a state in which the first and the second chassis are closed together.

SUMMARY OF THE INVENTION

The present invention was made in view of the foregoing technical problems. A basic object of the present invention is to enable to suppress the damage caused at the display section and/or the hinge mechanism by a simple constitution, in the openable and closable folding information-processing apparatus, when an impact load is applied from the front side of the information-processing apparatus, without increasing the manufacturing cost and without reducing the convenience in carrying the apparatus in folded state.

Therefore, an information-processing apparatus according to the present invention includes: a first chassis accommodating a display section and covering a periphery and a back face thereof, and having a substantially rectangular basic shape in a planar view; a second chassis accommodating an operation control section capable of generating a display signal to be inputted into the display section, and having a substantially rectangular basic shape in a planar view; and a hinge mechanism for coupling one side (a first side) of the second chassis and one side (a first side) of the first chassis and supporting both chassis in a relatively openable and closable manner. And, another side (a second side) of the first chassis is substantially parallel to the one side (the first side) of the first chassis in a planar view, another side (a second side) of the second chassis is substantially parallel to the one side (the first side) of the second chassis in a planar view, and widthwise directions of the first and the second chassis are substantially parallel to the one sides (the first sides) and the other sides (the second sides) thereof in a planar view. The other sides (the second sides) of the first and the second chassis are configured, in a planar view, so that only their central portions in the widthwise direction lay side-by-side to form substantially flat face, in a state where the first and the second chassis are closed together. And, the other sides (the second sides) of the first and the second chassis are further configured, in a planar view, so that the more they depart from the central portion toward each edge portion thereof in the widthwise direction, the more the other side (the second side) of the first chassis comes closer to the one side (the first side) of the first chassis than the other side (the second side) of the second chassis, in a state where the first and the second chassis are closed together.

In the present invention, the other side (the second side, that is, the front side as viewed by the user in a state where said user operates the information-processing apparatus) parallel to the one side (the first side) of the first chassis which is hinge-connected with the second chassis and accommodates the display section is configured, in a planar view, so that the more it departs from the central portion toward the edge portion in the widthwise direction, the more it comes closer to the one side (the first side) of the first chassis than to the other side (the second side) of the second chassis in a state where the first chassis is closed together with the second chassis. That is, in the above-mentioned state, the front side (the second side) surface of the first chassis is located rearward from the front side (the second side) surface of the second chassis except for the central portion in a widthwise direction parallel to the one side (the first side) in the planar view.

Therefore, when an impact load is applied from the front side (the second side) to the information-processing apparatus, for example by a front-first dropping, the impact load is hardly inputted into the front side surface of the first chassis as compared to the front side surface of the second chassis. Thereby, it is possible to suppress the display section accommodated in the first chassis from being subjected to large damage and also to suppress the hinge mechanism from being subjected to large damage. That is, according to the present invention, it is possible to obtain the above explained function and effect by the simple constitution which is only to devise the shape of the other side (the second side; i.e. the front side), in the planar view, of the first chassis and the second chassis, without increasing the manufacturing cost and without reducing the convenience in carrying the apparatus in the folded state.

In one embodiment of the present invention, it may be preferable that the other side (the second side) of the second chassis is located, in the planar view, between the other side (the second side) of the first chassis and a datum line straightly extending in the widthwise direction from the central portion, in a state where the first and the second chassis are closed together. And, the other side (the second side) of the second chassis is provided with an operation member projecting therefrom by a predetermined amount in the planar view. Further, the operation member is located at a portion departing from the central portion by a predetermined distance in the widthwise direction, and an end surface of the operation member is set to be located at a position between the other side (the second side) of the second chassis and the datum line.

According to this construction, even when the other side (the second side) of the second chassis is provided with the operation member formed to project by the predetermined amount toward the datum line in the planar view, at a portion departing from the central portion by the predetermined distance in the widthwise direction, the end surface of the projecting operation member is located at the position toward the other side (the second side) of the second chassis from the datum line. That is, the projecting end surface of the operation member is located rearward from the datum line.

Therefore, when an impact load is applied from the front side (the second side) to the information-processing apparatus, for example by a front-first dropping, the impact load is hardly inputted into the projecting end surface of the operation member as compared with the central portion and the front side surface near thereto. Thereby, it is possible to suppress the operation member from being subjected to large damage.

Further, an information-processing apparatus according to another aspect of the present invention includes: a first chassis accommodating a display section and covering a periphery and a back face thereof, and having a basic shape of substantially rectangle in a planar view; a second chassis accommodating an operation control section capable of generating a display signal to be inputted into the display section, and having a basic shape of substantially rectangle in a planar view; and a hinge mechanism for coupling one side (a first side) of the second chassis and one side (a first side) of the first chassis and supporting both chassis in a relatively openable and closable manner. And, another side (a second side) of the second chassis is substantially parallel to the one side (a first side) of the second chassis in a planar view, and a widthwise direction of the second chassis is substantially parallel to the one side (the first side) and the other side (the second side) thereof in a planar view. The other side (the second side) of the second chassis is configured, in a planar view, so that the more it departs from the central portion toward an edge portion thereof in the widthwise direction, the more it comes closer to the one side (the first side) of the second chassis than to a datum line straightly extending in the widthwise direction from the central portion. And, the other side (the second side) of the second chassis is provided with an operation member projecting therefrom by a predetermined amount in the planar view. Further, the operation member is located at a portion departing from the central portion by a predetermined distance in the widthwise direction, and an end surface of the operation member is set to locate at a position between the other side (the second side) of the second chassis and the datum line.

In another aspect of the present invention, the other side (the second side, that is, the front side as viewed by the user in a state where said user operates the information-processing apparatus) parallel to the one side (the first side) of the second chassis accommodating the operation control section is configured, in a planar view, so that the more it departs from the central portion toward the edge portion in the widthwise direction, the more it comes closer to the one side (the first side) of the second chassis than to the datum line straightly extending in the widthwise direction from the central portion. And, the other side (the second side) of the second chassis is provided with the operation member at the portion departing from the central portion by the predetermined distance in the widthwise direction, the operation member is formed to project by the predetermined amount toward the datum line in the planar view, and further, the end surface of the projecting operation member is located at the position toward the other side (the second side) of the second chassis from the datum line. That is, the projecting end surface of the operation member is located rearward from the datum line.

Therefore, when an impact load is applied from the front side (the second side) to the information-processing apparatus, for example by a front-first dropping, the impact load is hardly inputted into the projecting end surface of the operation member as compared with the central portion and the front side surface near thereto. Thereby, it is possible to suppress the operation member from being subjected to large damage.

BRIEF DESCRIPTION OF THE DRAWINGS

The present invention will be described in detail with reference to the accompanying drawings.

DETAILED DESCRIPTION OF THE PREFERRED EMBODIMENTS

Hereinafter, an embodiment of the present invention will be explained in detail, by taking a so-called laptop PC as an example, with reference to the accompanying drawings.

In the following description, some terms which respectively indicate specific directions ("up", "down", "left", "right" and other terms include their concept, "clockwise direction", "counter-clockwise direction", for example) may be used. However, it is to be noted that those terms are used to facilitate understanding of the present invention with reference to the accompanying drawings. And, the present invention should not be interpreted in a limited way by meanings of those terms.

Figure 1:
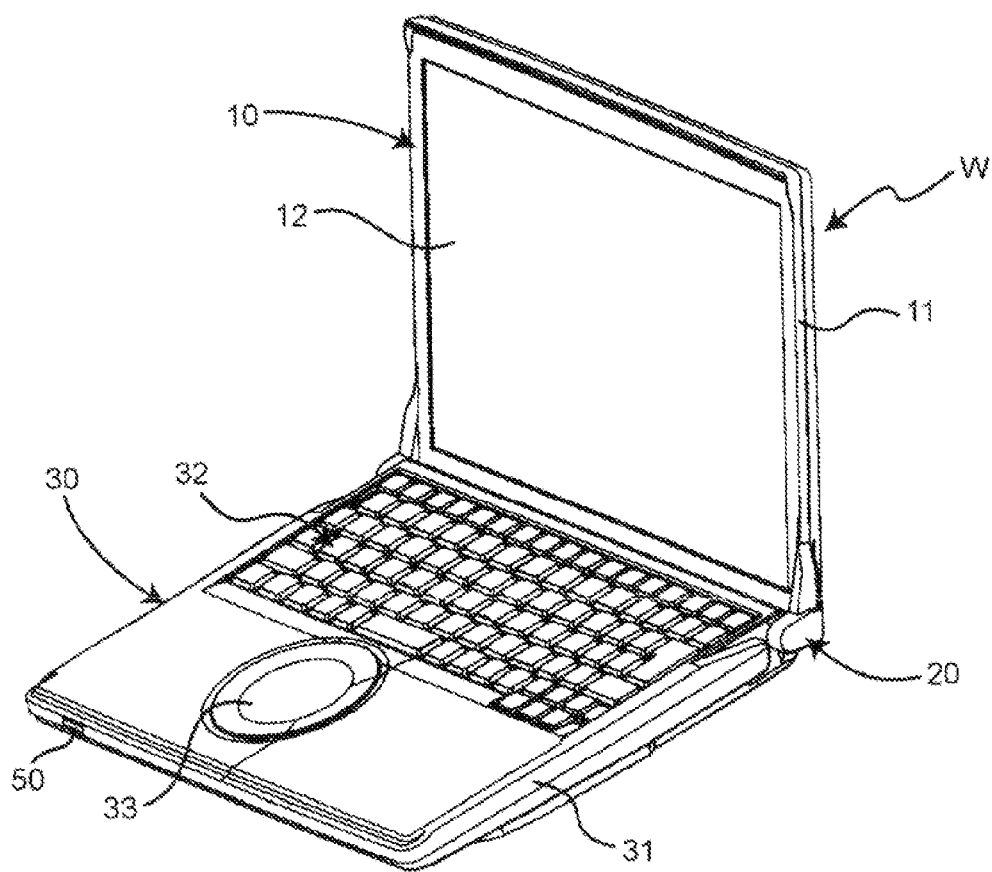
FIG. 1 is an overall perspective view of a laptop PC according to an embodiment of the present invention in an enabled state.
Figure 2:
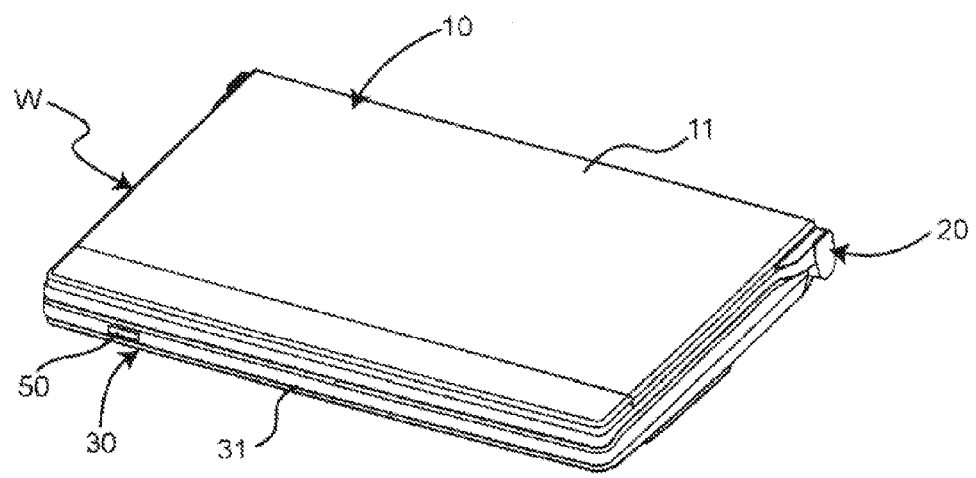
FIG. 2 is an overall perspective view of the laptop PC in a nonuse (closed) state.
Figure 3:
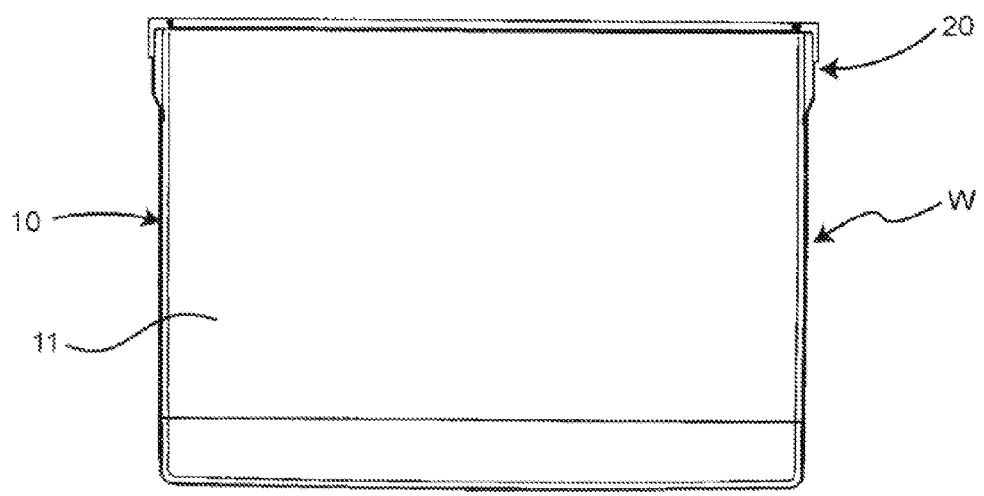
FIG. 3 is a plane view of the laptop PC in a nonuse (closed) state.
Figure 4:
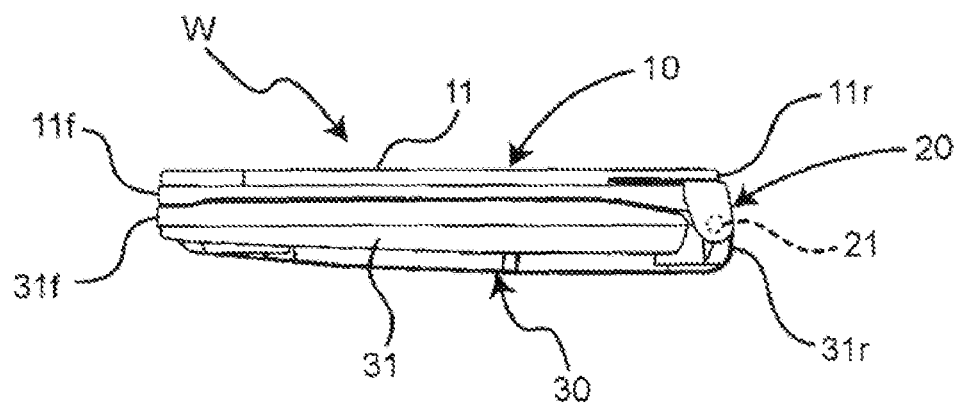
FIG. 4 is a side view of the laptop PC in a nonuse (closed) state.
Figure 5:
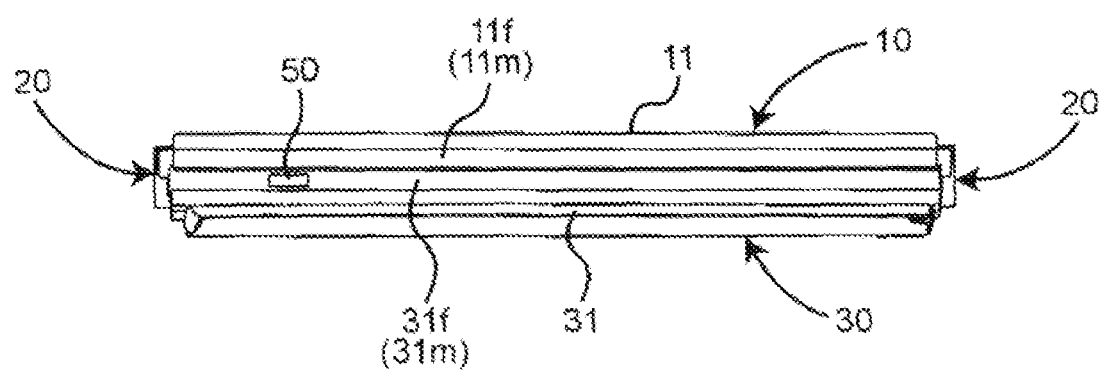
FIG. 5 is a front view of the laptop PC in a nonuse (closed) state.
Figure 6:
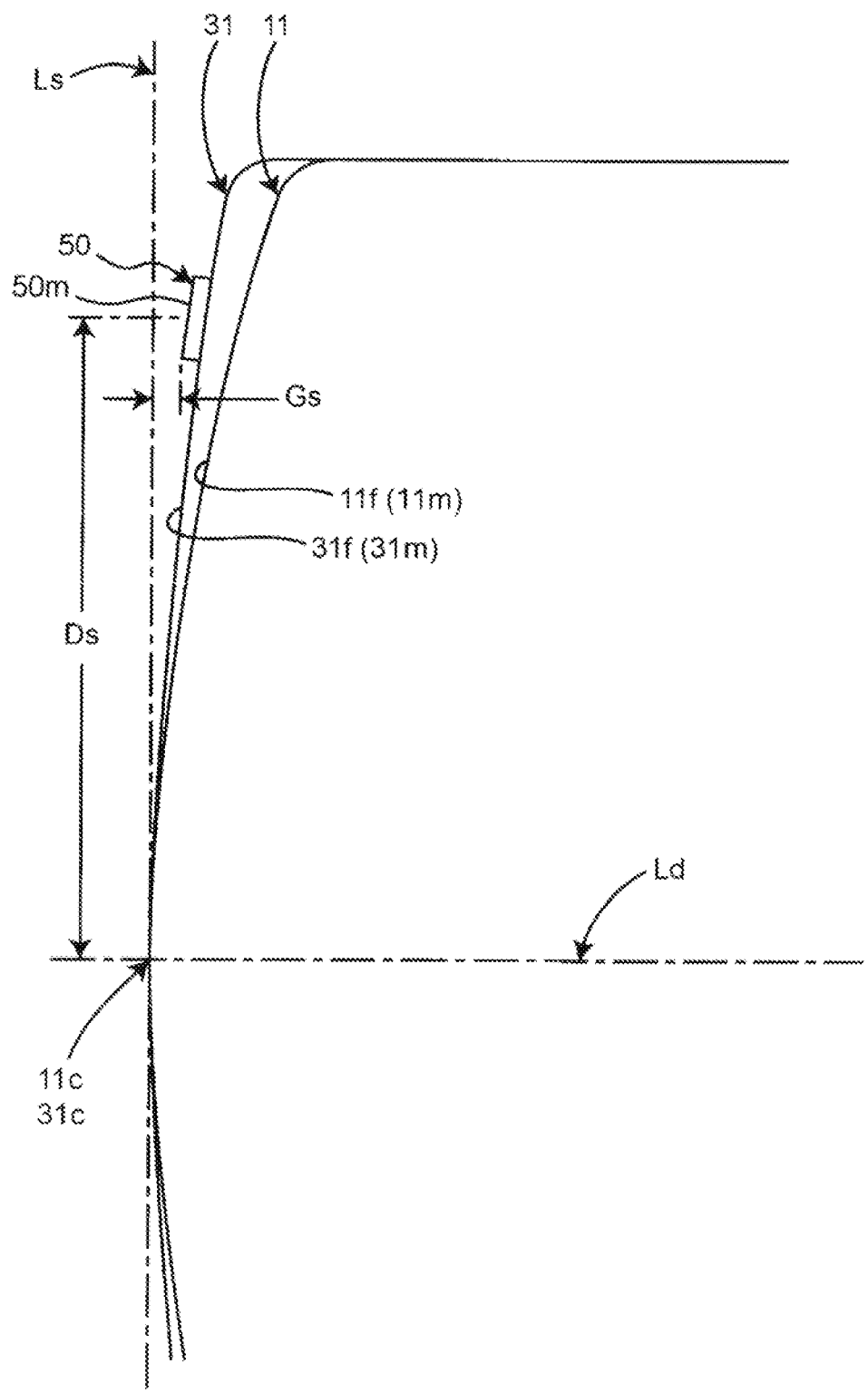
FIG. 6 is an enlarged plane view showing in close-up a major portion of the laptop PC in a nonuse (closed) state.

FIGS. 1 and 2 are perspective views showing the laptop PC according to the present embodiment in an enabled state and a nonuse (closed) state. And, FIGS. 3, 4 and 5 are a plane view, a side view and a front view of the laptop PC in the nonuse (closed) state. Further, FIG. 6 is an enlarged plane view showing in close-up a major portion of the laptop PC in a nonuse (closed) state.

As shown in these drawings, the laptop PC W as an electronic apparatus according to the present invention is provided with a display section 10 having a display screen 12 such as a liquid crystal type, and an operation control section 30 capable of generating a display signal which is to be inputted into the display section 10. The operation control section 30 includes an input device 32 such as a keyboard, signal processing circuits for generating display signals outputted to the display section based on input operations by the input device, a central processing unit (so-called CPU; not shown), and peripheral components thereof (also, not shown). Also, a touch-pad 33 is provided on a near side as viewed by a user in a state in which the user operates the laptop PC W, the user can conduct a cursor motion, a scroll of the display screen 12 and the like only by going over the touch-pad 33 from right to left or up and down with the finger.

The display section 10 is accommodated in a chassis 11 (a first chassis) for the display section side, and a periphery and a back face of the display section 10 are covered by the first chassis. On the other hand, the operation control section 30 is accommodated in a chassis 31 (a second chassis) for the operation control section side. And both the chassis are coupled to each other by a hinge mechanism 20 in a relatively openable and closable manner.

In more detail, both the first chassis 11 and the second chassis 31 have a substantially rectangular overall basic shape in a planar view (that is, in a state as viewed from the front side thereof). And, one side (the first side) 11r of the first chassis 11 and one side (the first side) 31r of the second chassis 31 (that is, both the rear sides as viewed by the user in a state where the user operates the laptop PC W) are coupled via the hinge mechanism 20. Thereby, the first chassis 11 and the second chassis 31 can move in a relatively openable and closable manner around a hinge axle 21 (refer to FIG. 4). It is to be noted that the term "rectangle" includes a "square" as one configuration thereof in the present specification.

And, a power switch 50 as an operation member is arranged at a predetermined position on a side surface (a front side surface) of another side 31 (a second side, that is, a front side surface as viewed by the user in a state where the user operates the laptop PC W) parallel to the one side (the first side, that is, the rear sides as viewed by the user in a state where the user operates the laptop PC W) of the second chassis 31.

As shown in detail in FIG. 6, in the present embodiment, the front side 11f (the second side) parallel to the rear side 11r (the first side) of the first chassis 11 which is hinge-connected with the second chassis 31 and accommodates the display section 10 is configured so that only its central portion 11c in a widthwise direction parallel to the rear side 11r (the first side) lays side-by-side to form a substantially flat face with the front side 31f (a second side) of the second chassis 31 in a state where the first chassis 11 is closed together with the second chassis 31.

And also, the front side 11f (the second side) of the first chassis 31 is configured, in a planar view, so that the more it departs from the central portion 11c toward an edge portion in the widthwise direction, the more it comes closer to the rear side 11r (the first side) of the first chassis 11 than to the front side 31f (the second side) of the second chassis 31 in a state where the first chassis 11 is closed together with the second chassis 31.

In more detail, the front side 11f (the second side) parallel to the rear side 11r (the first side) is formed, in a planar view, into a curved shape having a predetermined curvature. That is, a front side surface 11m of the first chassis 11 is positioned rearward from a front side surface 31m of the second chassis 31 except for the central portion 11c. It is to be noted that the curvature of the front side 11f of the first chassis 11 is preferably determined within a range which does not affect the size of display screen 12.

Therefore, when an impact load is applied from the front side surface 11m, 31m (the second side) to the laptop PC W, for example by a front-first dropping, the impact load is hardly inputted into the front side surface 11m of the first chassis 11 as compared to the front side surface 31m of the second chassis 31. Thereby, it is possible to suppress the display section 10 accommodated in the first chassis 11 from being subjected to large damage and also to suppress the hinge mechanism 20 from being subjected to large damage. That is, according to the present embodiment, it is possible to obtain the above explained function and effect by the simple constitution which is only to devise the shape of the other side 11f, 31f (the second side; i.e. the front side), in the planar view, of the first chassis 11 and the second chassis 31, without increasing the manufacturing cost and without detracting the convenience in carrying the laptop PC W in a folded state.

Further, in the present embodiment, the front side 31f (the second side) of the second chassis 31 is located, in the planar view, between a datum line Ls extending straight in the widthwise direction from the central portion 31c in the widthwise direction parallel to the rear side 31r (the first side), and the front side 11f (the second side) of the first chassis 11, in a state where the first and the second chassis 11 and 31 are closed together.

In more detail, the front side 31f (the second side) of the second chassis 31 is formed, in a planar view, into a curved shape having a predetermined curvature which is smaller than that of the front side 11f of the first chassis 11. It is to be noted that the datum line Ls is perpendicular to a center line Ld in the widthwise direction of the first chassis 11 and the second chassis 31, and constitutes a tangential line at the center in the widthwise direction of the front side 11*f* of the first chassis 11 and the front side 31*f* of the second chassis 31.

The above-mentioned power switch 50 is provided at the portion departing by a predetermined distance Ds in widthwise direction, so as to project by a predetermined amount from the front side surface 31*m* of the second chassis 31. But, the projecting end surface 50*m* of the power switch 50 is determined so as to be located at a position toward the front side surface 31*m* of the second chassis 31 from the datum line Ls by a predetermined distance Gs. The distance Gs is preferably determined to be equal or longer than 1 mm. That is, the power switch 50 is designed so that the projecting end surface 50*m* thereof is not located forward beyond the datum line Ls.

If the projecting end surface 50*m* of the power switch 50 is located forward beyond the datum line Ls, when an impact load is applied from the front side surface 11*m*, 31*m* to the laptop PC W, for example by a front-first dropping, the impact load is directly inputted into the projecting end surface 50*m* of the power switch 50 since the power switch 50 projects forward from the front side surface 31*m* of the second chassis 31. And, this would rather easily cause the failure of the power switch 50.

In the present embodiment, as explained above, even in the case where the front side 31*f* (the second side) of the second chassis 31 is provided with the power switch 50 formed to project by the predetermined amount toward the datum line Ls in the planar view, at a portion departing by the predetermined distance Ds in the widthwise direction from the central portion 31*c* of the front side surface 31*m* of the second chassis 31, the projecting end surface 50*m* of the power switch 50 is located at the position toward the front side surface 31*m* of the second chassis 31 from the datum line Ls. That is, the projecting end surface 50*m* of the power switch 50 is located rearward from the datum line Ls.

Therefore, when an impact load is applied from the front side surface 11*m*, 31*m* to the laptop PC W, for example by a front-first dropping, the impact load is hardly inputted into the projecting end surface 50*m* of the power switch 50 as compared with the central portion 31*c* and the front side surface 31*m* near thereto of the second chassis 31. Thereby, it is possible to suppress the power switch 50 from being subjected to large damage.

In the above-explained embodiment, the front side 11*f* of the first chassis 11 and the front side 31*f* of the first chassis 31 are formed, in the planar view, into the curved shapes having the predetermined curvatures, respectively. However, in the present invention, the shapes of the front side 11*f* of the first chassis 11 and the front side 31*f* of the first chassis 31 in the planar view are not limited to the above-mentioned shapes. And, for example, a slope line gently sloping with respect to the datum line Ls or a combination of such a slope line and the above-mentioned curve and the like may be employed.

It is to be noted that, although the above described embodiment is exemplified as a laptop PC, the present invention is not limited to the above-described embodiment, and is effectively applicable also to various other information-processing equipment having a first chassis accommodating a display section and a second chassis accommodating an operation control section, and both chassis are supported in a relatively openable and closable manner.

The present invention is not limited to the above-described embodiment and variations thereof, and various modifications and changes may be made without departing from the spirit and scope of the invention.

The present invention can be utilized as a structure of the chassis in information-processing equipment such as laptop personal computers.

What is claimed is:

1. An information-processing apparatus comprising:
   a first chassis accommodating a display section and covering a periphery and a back face thereof, and having a substantially rectangular basic shape in a planar view;
   a second chassis accommodating an operation control section capable of generating a display signal to be inputted into the display section, and having a substantially rectangular basic shape in a planar view; and
   a hinge mechanism for coupling one side of the second chassis and one side of the first chassis and supporting both chassis in a relatively openable and closable manner,
   wherein another side of the first chassis is substantially parallel to the one side of the first chassis in a planar view, another side of the second chassis is substantially parallel to the one side of the second chassis in a planar view, and widthwise directions of the first and the second chassis are substantially parallel to the one sides and the other sides thereof in a planar view;
   wherein the other sides of the first and the second chassis are configured, in a planar view, so that only their central portions in the widthwise direction lay side-by-side to form a substantially flat face, in a state where the first and the second chassis are closed together, and
   wherein the other sides of the first and the second chassis are further configured, in a planar view, so that the more they depart from the central portion toward each edge portion thereof in the widthwise direction, the more the other side of the first chassis comes closer to the one side of the first chassis than the other side of the second chassis, in a state where the first and the second chassis are closed together.

2. An information-processing apparatus according to claim 1,
   wherein the other side of the second chassis is located, in the planar view, between the other side of the first chassis and a datum line extending straight in the widthwise direction from the central portion, in a state where the first and the second chassis are closed together;
   wherein the other side of the second chassis is provided with an operation member projecting therefrom by a predetermined amount in the planar view; and
   wherein the operation member is located at a portion departing from the central portion by a predetermined distance in the widthwise direction, and an end surface of the operation member is set to be located at a position between the other side of the second chassis and the datum line.

3. An information-processing apparatus comprising:
   a first chassis accommodating a display section and covering a periphery and a back face thereof, and having a substantially rectangular basic shape in a planar view;
   a second chassis accommodating an operation control section capable of generating a display signal to be inputted into the display section, and having a substantially rectangular basic shape in a planar view; and a hinge mechanism for coupling one side of the second chassis and one side of the first chassis and supporting both chassis in a relatively openable and closable manner, wherein another side of the second chassis is substantially parallel to the one side of the second chassis in a planar view, and a widthwise direction of the second chassis is substantially parallel to the one side and the other side thereof in a planar view;

wherein the other side of the second chassis is configured, in a planar view, so that the more it departs from the central portion toward an edge portion thereof in the widthwise direction, the more it comes closer to the one side of the second chassis than to a datum line extending straight in the widthwise direction from the central portion;

wherein the other side of the second chassis is provided with an operation member projecting therefrom by a predetermined amount in the planar view; and wherein the operation member is located at a portion departing from the central portion by a predetermined distance in the widthwise direction, and an end surface of the operation member is set to be located at a position between the other side of the second chassis and the datum line.

* * * * *